United States Patent [19]

Lee

[11] Patent Number: 6,013,990
[45] Date of Patent: Jan. 11, 2000

[54] MONITORING POWER SUPPLY VOLTAGE TO HARD DISK DRIVE

[75] Inventor: Bong-Jin Lee, Seoul, Rep. of Korea

[73] Assignee: SamSung Electronics Co., Ltd., Suwon, Rep. of Korea

[21] Appl. No.: 08/902,354

[22] Filed: Jul. 29, 1997

[30] Foreign Application Priority Data

Aug. 9, 1996 [KR] Rep. of Korea ....................... 96 33237

[51] Int. Cl.[7] ........................................................ H02P 1/54
[52] U.S. Cl. ........................... 318/101; 318/632; 318/635; 323/901; 323/908; 323/284
[58] Field of Search ..................... 318/101–104, 318/611, 615, 632, 635; 323/901, 908, 234, 265–290; 363/49

[56] References Cited

U.S. PATENT DOCUMENTS

| | | | |
|---|---|---|---|
| 4,634,951 | 1/1987 | Kampf et al. | 318/778 |
| 4,647,825 | 3/1987 | Profio et al. | 318/798 |
| 5,003,242 | 3/1991 | Liber | 318/778 |
| 5,206,572 | 4/1993 | Farag et al. | 318/778 |
| 5,339,446 | 8/1994 | Yamasaki et al. | |
| 5,457,365 | 10/1995 | Blagaila et al. | |

*Primary Examiner*—David Martin
*Attorney, Agent, or Firm*—Robert E. Bushnell, Esq.

[57] ABSTRACT

A hard disk drive for supplying a power supply voltage by monitoring a power supply voltage and method of controlling the same. The hard disk drive includes a power supply monitor circuit for monitoring an initially supplied power supply voltage, and a controller for supplying a prescribed reference voltage to the power supply monitor circuit, and for controlling the power supply voltage generated when initially activating a spindle motor by varying a permissible variation level of the power supply voltage of the power supply monitor circuit.

2 Claims, 5 Drawing Sheets

MONITORING POWER SUPPLY VOLTAGE TO HARD DISK DRIVE

CLAIM OF PRIORITY

This application makes reference to, incorporates the same herein, and claims all benefits accruing under 35 U.S.C. §119 from an application for HARD DISK DRIVE FOR SUPPLYING STABLE POWER VOLTAGE BY MONITORING POWER VOLTAGE AND METHOD OF CONTROLLING SAME earlier filed in the Korean Industrial Property Office on the 9$^{th}$ day of August 1996 and there duly assigned Ser. No. 33237/1996, a copy of which application is annexed hereto.

BACKGROUND OF THE INVENTION

1. Field of the Invention

The present invention relates to a power supply monitor circuit of a hard disk drive and, more particularly, to a method for reducing a malfunction generated by a variation in a power supply voltage due to excessive current drawn when driving a spindle motor.

2. Description of the Related Art

Typically, a hard disk drive system combine a hard disk assembly (HDA) consisting of mechanical elements with a printed circuit board (PCB) consisting of circuit elements. Since the hard disk drive can access a large amount of data at a high speed by magnetically writing/reading data in/from a rotating magnetic disk, it is widely used as an auxiliary memory unit of a computer system. The hard disk drive uses a power supply monitor circuit to determine whether a supplied power supply voltage is normal or abnormal. A power supply monitor circuit monitors power supply voltages of 12V and 5V, and supplies an output $\overline{PF}$ of a logic "HIGH" level to a controller, for example, a central processing unit (CPU) when the power supply voltages are normal, thereby initializing various integrated circuits and driving a spindle motor for rotating the magnetic disk. However, if any one of the power supply voltages is unstable, the power supply monitor circuit supplies the output $\overline{PF}$ of a logic "LOW" level to the controller. Therefore, the integrated circuits are not initialized and the hard disk drive can not be used. A permissible voltage variation of the power supply voltage of 12V is adjusted to 10.8V (−10%) by using the ratio of two resistors, and the voltage variation of the power supply voltage of 5V is adjusted to 4.5V (−10%) by using the ratio of resistors. As one of the factors giving rise to a unstable power supply voltage, there is an activation current supplied initially to the spindle motor in order to rotate the magnetic disk at a constant velocity. The activation current is about 1 ampere and makes the power supply voltage unstable since a high current is instantaneously drawn. In more detail, if the spindle motor instantaneously draws a large amount of current, the power supply voltage Vcc monitored by the power supply monitor circuit is lowered to a voltage less than its permissible variation voltage, due to the high current. In this case, the output $\overline{PF}$ of the power supply monitor circuit is also instantaneously lowered to a logic "LOW" level and such an output is supplied to the controller. Hence, there is a malfunction in initializing the integrated circuits.

The patent to Blagaila et al., U.S. Pat. No. 5,457,365, entitled Disk Drive Power Management System, discloses a system in which the drive current for the hard disk motor is limited so that the supply voltage does not fall below a predetermined limit greater than the shut down voltage of the power supply monitor.

The patent to Yamasaki et al., U.S. Pat. No. 5,339,446, entitled Power Supply And Method For Use In A Computer System To Confirm A Save Operation Of The Computer System And To Stop A Supply Of Power To The Computer System After Confirmation, discloses a system which shuts off the power to a hard disk drive in a predetermined sequence to prevent damage to the hard disk drive.

SUMMARY OF THE INVENTION

It is an object of the present invention to provide a technique for varying a permissible variation level of a power supply voltage of a power supply monitor circuit in order to reduce a malfunction generated by a variation in the power supply voltage due to an excessive current drawn when initially driving a spindle motor of a hard disk drive.

The present invention includes supplying a stable power supply voltage to a hard disk drive by monitoring a power supply. In one embodiment, the hard disk drive includes a power supply monitor circuit for monitoring whether an initially supplied power supply voltage is stable; and a controller for supplying a prescribed reference voltage to the power supply monitor circuit, and stabilizing a variation in the power supply voltage generated when initially activating a spindle motor by varying a permissible variation level of the power supply voltage of the power supply monitor circuit.

The object, features and advantages of the present invention will be further described and more readily apparent from the detailed description of the preferred embodiment when taken in conjunction with the accompanying drawings, in which like reference numerals and symbols designate like parts. In the following description, well known features or constructions are not described so as not to obscure the present invention.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
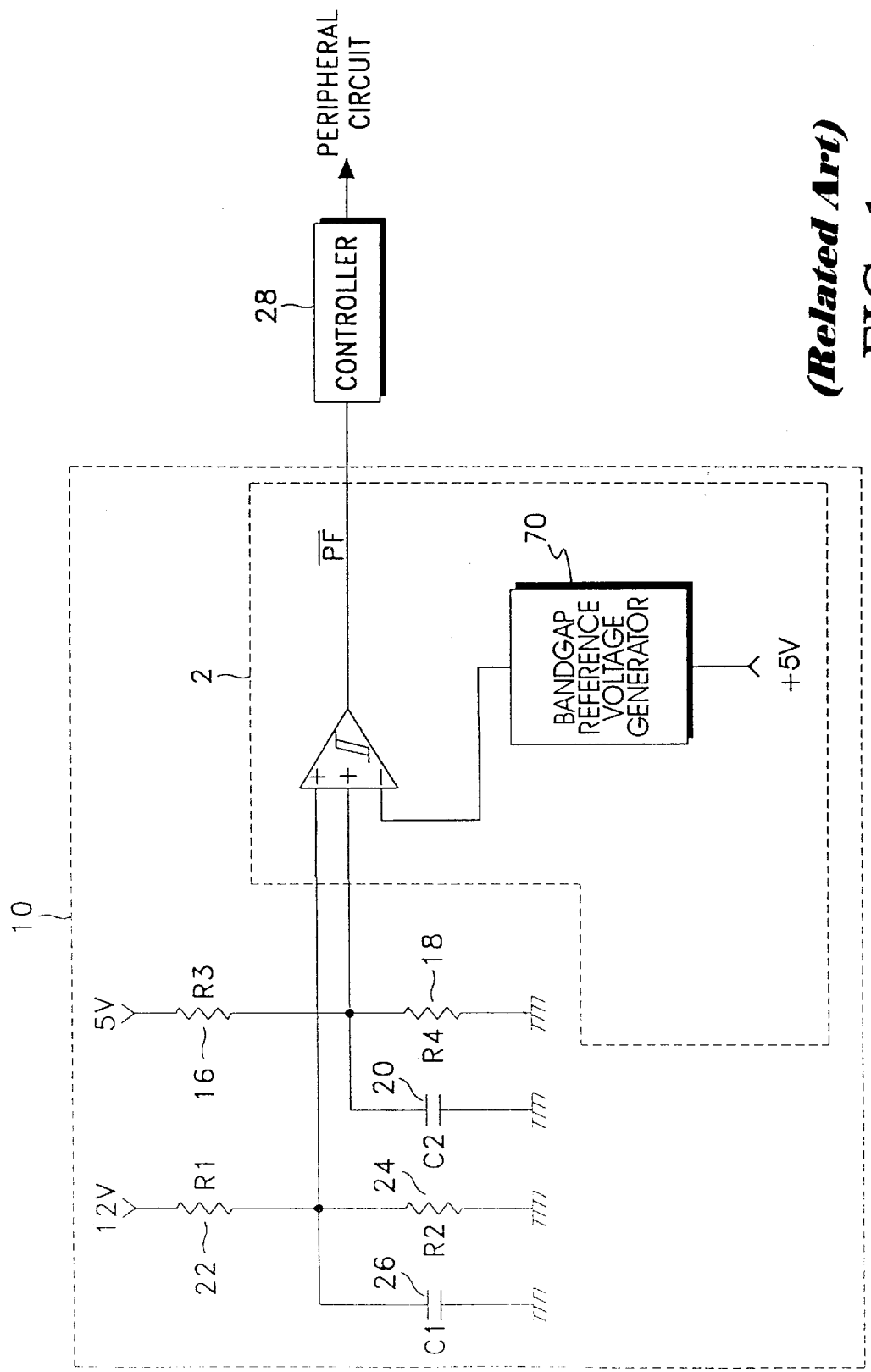
FIG. 1 is a circuit diagram of an earlier power supply monitor for a hard disk drive.

FIG. 1 illustrates a power supply monitor circuit as discussed in the Description of the Related Art above.

A power supply monitor circuit 10 monitors power supply voltages of 12V and 5V and supplies an output to a controller 28. A Schmidt trigger circuit 2 has two non-inverting inputs and one inverting input terminal. The inverting input terminal is connected to a band gap reference voltage generator 70 which provides a reference voltage for the Schmidt trigger 2.

Each of the non-inverting input terminals is connected to a pair of resistors 16 and 18 and 22 and 24 which provide voltages proportional to the 12V and 5V supplies.

Capacitors 20 and 26 filter out noise and prevent the Schmidt trigger 2 from operating due to voltage transients.

Figure 2:
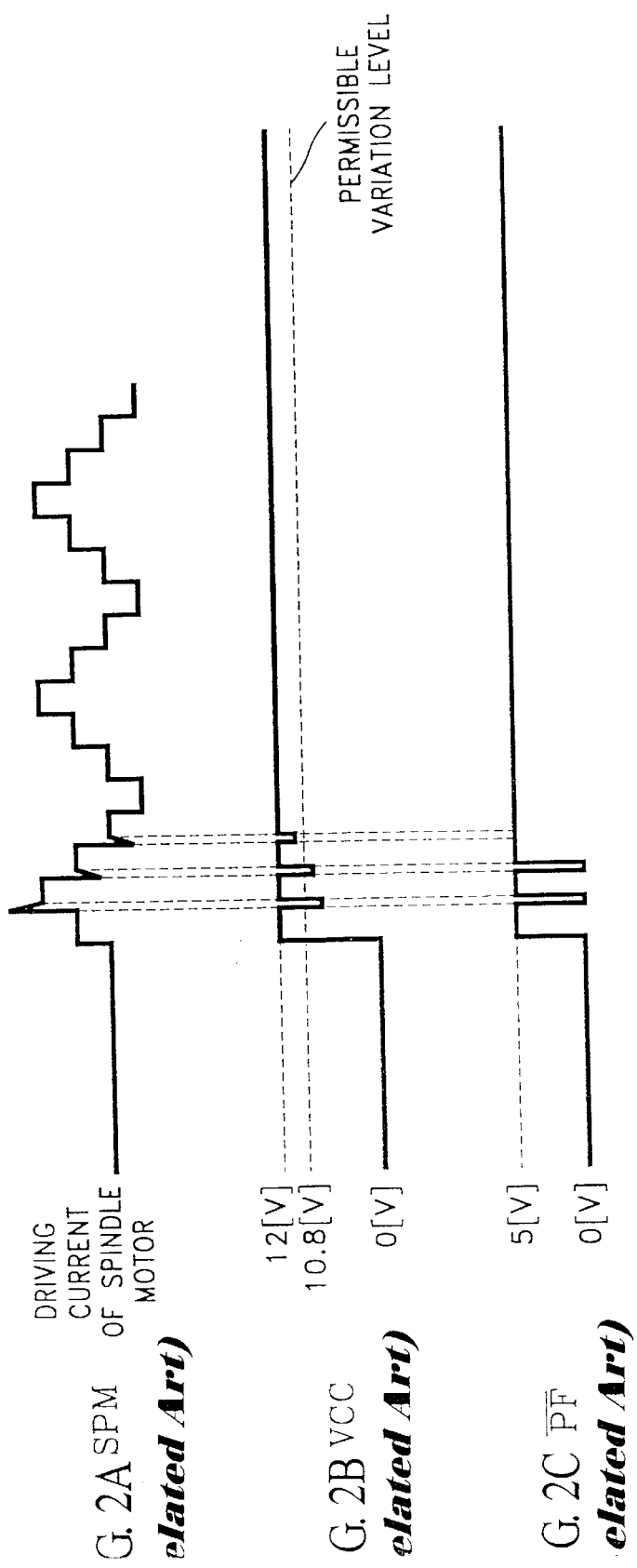
FIGS. 2A to 2C are waveform charts of the circuit of FIG. 1 driving a spindle motor.

FIGS. 2A–2C illustrate the currents and voltages at specific points in the circuit of FIG. 1, as discussed in the Description of the Related Art.

Figure 3:
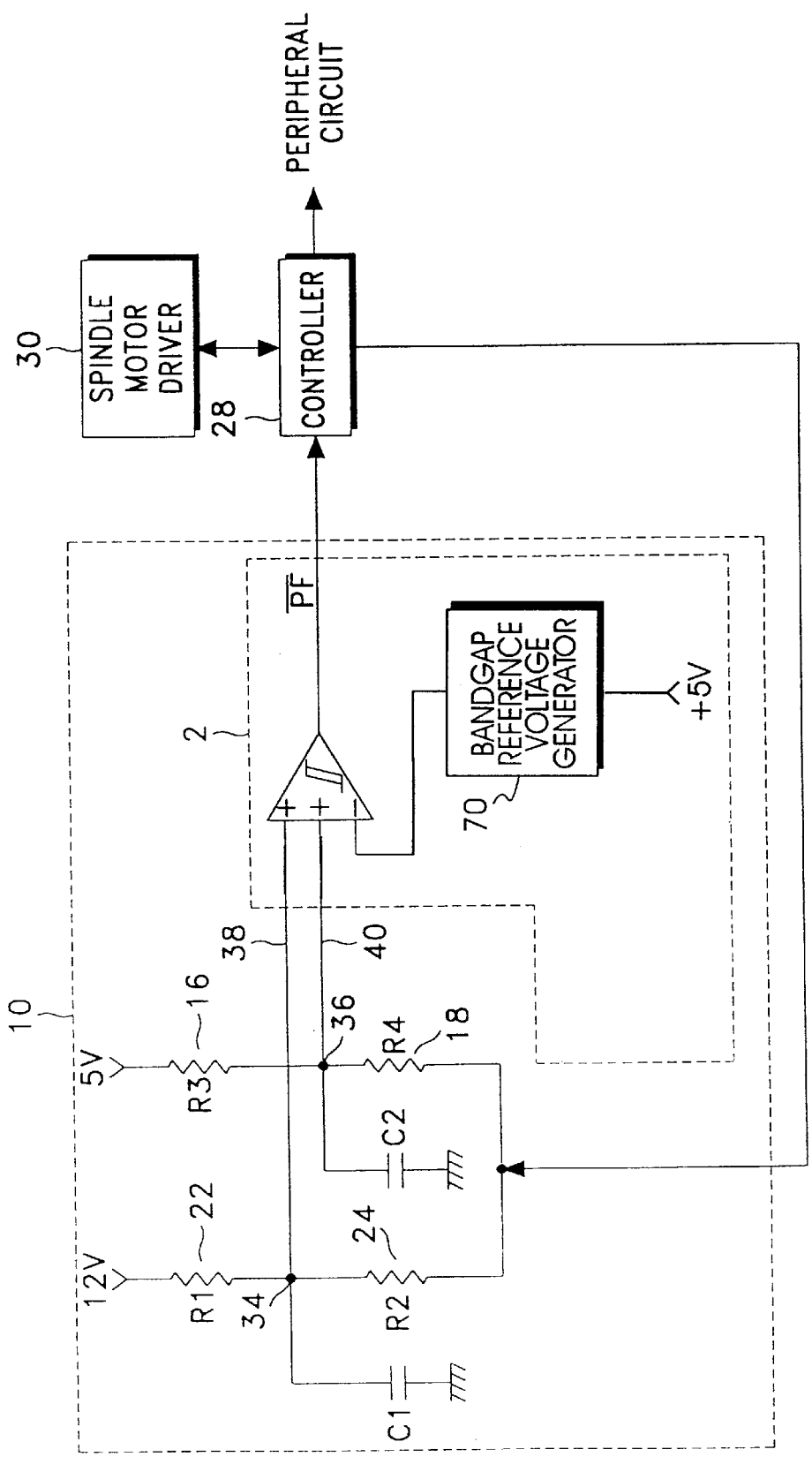
FIG. 3 is a circuit diagram of a power supply monitor circuit of a hard disk drive according to the present invention.

FIG. 3 illustrates a power supply monitor circuit of a hard disk drive according to the present invention. A power supply monitor circuit 10 includes a Schmidt trigger 2 having two non-inverting input terminals and one inverting input terminal and monitors a power supply voltage with its permissible variation level. On the basis of a load point 34 on a load 38 connected to a first non-inverting terminal of the Schmidt trigger 2, a power supply voltage load of 12V is connected in parallel to a control voltage load generated by a controller 28 to vary its permissible variation level. On the basis of a load point 36 on a load 40 connected to a second non-inverting input terminal of the Schmidt trigger 2, a power supply voltage load of 5V is connected in parallel to the control voltage load generated by the controller 28 to vary its permissible variation level. If the power supply voltage of 12V is supplied, its permissible variation level is adjusted by using the ratio of resistors 22 and 24. The permissible variation level of the power supply voltage of 5V is adjusted by using the ratio of resistors 16 and 18. Initially, if the power supply voltage is supplied, the controller 28 senses an output $\overline{PF}$ of the power supply monitor circuit 10 and operates a system by initializing all peripheral circuits.

Figure 4:
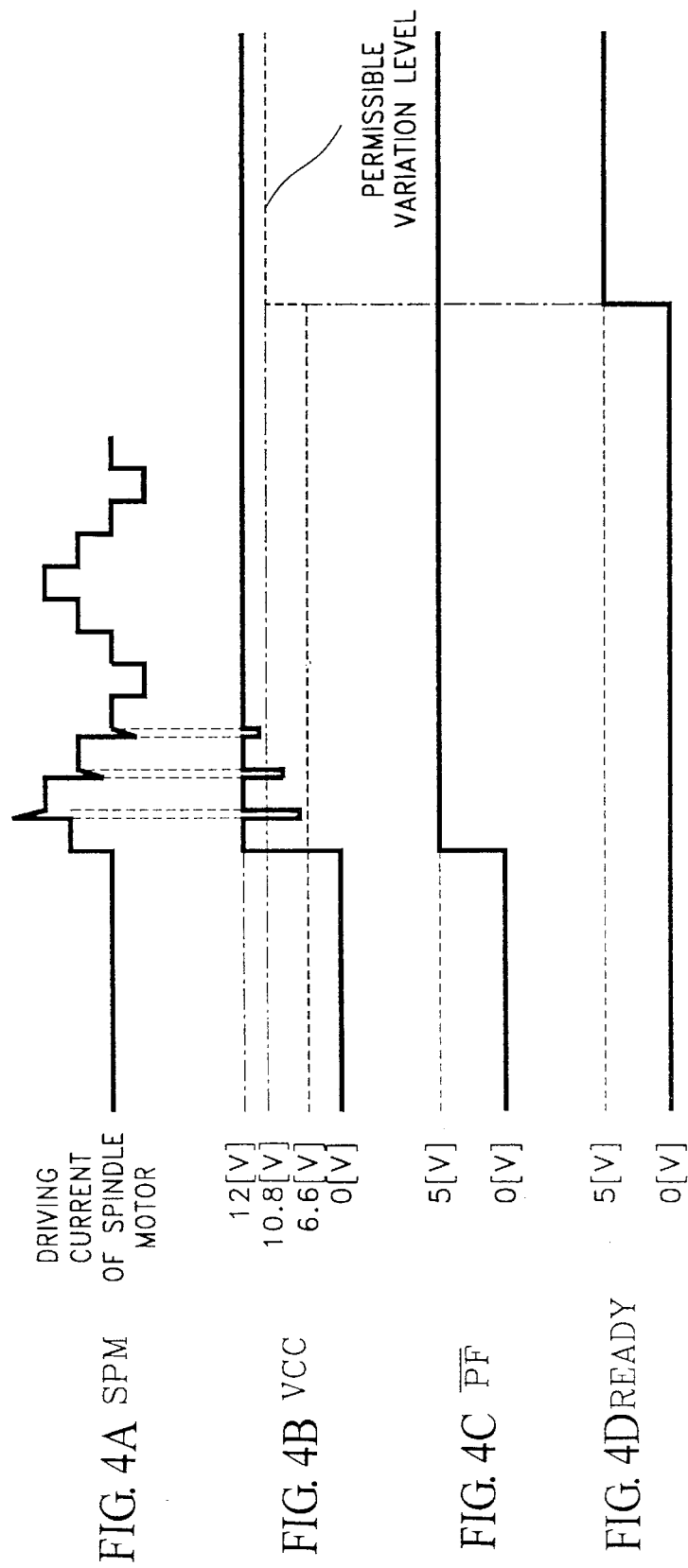
FIGS. 4A to 4D are waveform charts of the circuit of FIG. 3 driving a spindle motor.

FIGS. 4A to 4D are waveform charts of the circuit of FIG. 3 driving a spindle motor. If the power supply voltage of 12V is initially supplied, the controller 28 supplies a logic "HIGH" level signal to the load point 34 to lower the permissible variation level of the power supply voltage of 12V to 6.6V as indicated in FIG. 4B. Thereafter, the controller 28 supplies a spindle motor driving current indicated in FIG. 4A. In this case, the power supply voltage varies instantaneously as shown in FIG. 4B. However, since a level of the instantaneously varying power supply voltage is higher than the permissible variation level adjusted by the controller 28, the effect of the unstable power supply voltage is disregarded and the output $\overline{PF}$ of a constant level is generated as shown in FIG. 4C. The controller 28 senses a ready signal of the spindle motor indicating that the spindle motor is rotated at a constant velocity as shown in FIG. 4D and raises the lowered permissible variation level to a previous permissible variation level of 10.8V as indicated in FIG. 4B by inverting the logic "HIGH" signal supplied to the load point 34 to a logic "LOW" level signal.

Figure 5:
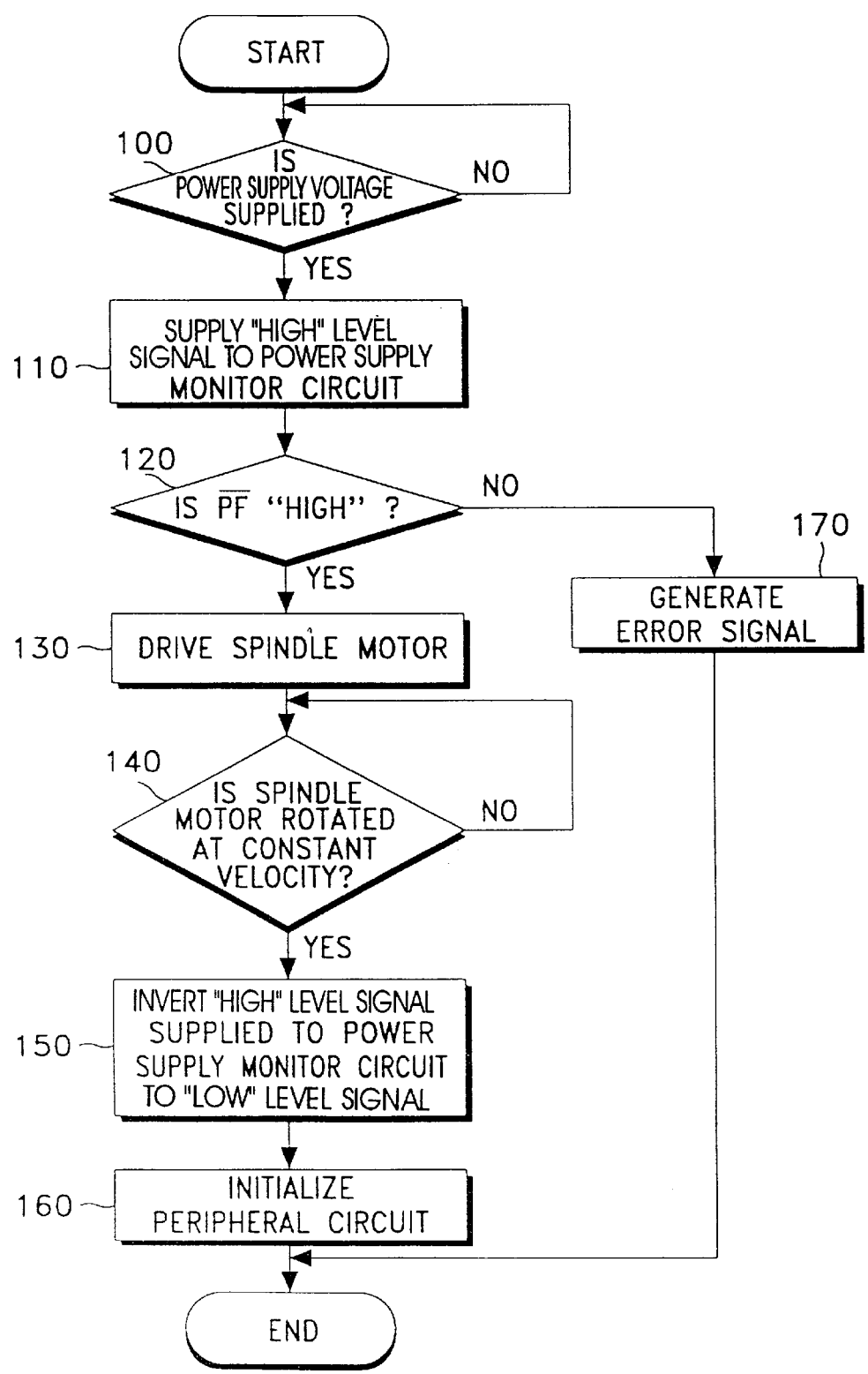
FIG. 5 is a flowchart showing the control procedure for monitoring a power supply voltage by using its permissible variation level according to the present invention.

FIG. 5 illustrates a control flow for monitoring the power supply voltage by using its permissible variation level. At step 100, the controller 28 determines whether or not an initial power supply voltage is supplied. If the initial power supply voltage is supplied, the controller 28 supplies a logic "HIGH" level signal to the load points 34 and 36 which are respectively connected to the first and second non-inverting input terminals of the Schmidt trigger 2 to lower the permissible variation level of the power supply voltage. The lowered permissible variation level is given by:

$$\left(\frac{K \times R2}{R1 + R2} \times 12 \text{ V}\right) - 5 \text{ V} = 6.6 \text{ V} \tag{1}$$

where K is a constant.

The controller 28 checks whether the output $\overline{PF}$ of the Schmidt trigger 2 of the power supply monitor circuit 10 is a logic "HIGH" level at step 120. If the output $\overline{PF}$ is a logic "LOW" level, the controller 28 generates an error signal and cuts off the supply of the power supply voltage at step 170. If the output $\overline{PF}$ is a logic "HIGH" level, the controller 28 drives the spindle motor by supplying a control signal to a spindle motor driver 30 at step 130. A determination is made as to whether or not the spindle motor is rotated at a constant velocity at step 140. If not, the controller 28 continues to check the rotation of the spindle motor. If the spindle motor is rotated at a constant velocity, the controller 28 inverts the logic "HIGH" level signal supplied to the load points 34 and 36 connected to the first and second non-inverting input terminals of the Schmidt trigger 2 to raise the permissible variation level of the power supply voltage to an original permissible variation level at step 150. The controller 28 initializes each peripheral circuit at step 160. The raised permissible variation level is given by:

$$\left(\frac{K \times R2}{R1 + R2} \times 12 \text{ V}\right) = 10.8 \text{ V} \tag{2}$$

As described above, a malfunction generated by a variation in the power supply voltage due to the excessive current drawn when driving the spindle motor of the hard disk drive is reduced. Therefore, an initialization operation of the hard disk can be stabilized.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An apparatus for supplying power to a hard disk drive, comprising:

a power supply monitor circuit for monitoring an initially supplied power supply voltage; and a controller for supplying a prescribed reference voltage to said power supply monitor circuit, and for controlling the power supply voltage generated when initially activating a spindle motor by varying a permissible variation level of the power supply voltage of said power supply monitor circuit; said power supply monitor circuit comprising a Schmidt trigger, having two non-inverting input terminals and one inverting input terminal, for monitoring two power supply voltages with the permissible variation level varying according to the two power supply voltages respectively supplied to said two non-inverting input terminals and said reference voltage supplied by said controller.

2. A method of controlling a power supply voltage using a permissible variation level of a hard disk drive, said hard disk drive having a power supply monitor circuit for monitoring an initially supplied power supply voltage, and a controller for supplying a prescribed reference voltage to said power supply monitor circuit and for controlling the power supply voltage generated when initially activating a spindle motor by varying the permissible variation level of the power supply voltage of said power supply monitor circuit and including a sensor for sensing the velocity of the spindle motor, said method comprising the steps of:

upon an initial power supply voltage being supplied to said power supply monitor circuit, supplying the reference voltage of a prescribed level to said power supply monitor circuit so as to lower the permissible variation level of the power supply voltage to a level lower than an original permissable variation level of a power supply voltage generated when activating said spindle motor;

upon the sensor outputting a ready signal indicating that said spindle motor is rotating at a constant velocity, adjusting the permissible variation level of the power supply voltage of said power supply monitor circuit to the original permissible variation level by lowering the reference voltage supplied to said power supply monitor circuit.

* * * * *